United States Patent
Blue et al.

(10) Patent No.: US 11,285,960 B2
(45) Date of Patent: Mar. 29, 2022

(54) METHOD FOR OPERATING A VEHICLE HAVING A DISCONNECT CLUTCH

(71) Applicant: Ford Global Technologies, LLC, Dearborn, MI (US)

(72) Inventors: Corey James Blue, Belleville, MI (US); Bradley Dean Riedle, Northville, MI (US); Andrew E. Burt, Royal Oak, MI (US); Joseph F. Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 16/579,268

(22) Filed: Sep. 23, 2019

(65) Prior Publication Data

US 2021/0086775 A1  Mar. 25, 2021

(51) Int. Cl.
| | |
|---|---|
| *F16D 48/06* | (2006.01) |
| *B60W 30/192* | (2012.01) |
| *B60K 6/387* | (2007.10) |
| *B60W 20/00* | (2016.01) |
| *B60W 10/06* | (2006.01) |
| *B60W 10/02* | (2006.01) |

(52) U.S. Cl.
CPC ........... *B60W 30/192* (2013.01); *B60K 6/387* (2013.01); *B60W 10/02* (2013.01); *B60W 10/06* (2013.01); *B60W 20/00* (2013.01); *F16D 48/066* (2013.01); *B60W 2554/00* (2020.02); *B60W 2710/021* (2013.01); *B60W 2710/06* (2013.01); *F16D 2500/106* (2013.01); *F16D 2500/10418* (2013.01); *F16D 2500/3065* (2013.01)

(58) Field of Classification Search
CPC .... B60W 30/192; B60W 10/02; B60W 10/06; B60W 20/00; B60W 2554/00; B60W 2710/021; B60W 2710/06; B60W 2710/027; B60W 10/08; B60W 20/40; B60W 40/00; B60W 2710/02; B60W 2540/10; B60K 6/387; B60K 2006/268; B60K 2006/4825; F16D 48/066; F16D 2500/10418; F16D 2500/106; F16D 2500/3065; F16D 2500/3024; F16D 2500/70408; F16D 48/06; F16D 2500/1026; F16D 48/08; F16D 2500/1066; F16D 2500/3124; F16D 2500/3166; F16D 2500/50239; F16D 2500/50808; F16D 2500/7041

See application file for complete search history.

(56) References Cited

U.S. PATENT DOCUMENTS

| | | | |
|---|---|---|---|
| 9,039,570 B2 | 5/2015 | Doering et al. | |
| 9,108,614 B2 | 8/2015 | Doering et al. | |
| 10,479,343 B2 * | 11/2019 | Frait | B60K 6/48 |
| 10,640,106 B2 * | 5/2020 | Meyer | B60W 10/02 |
| 10,800,396 B2 * | 10/2020 | Ford | B60W 10/02 |
| 2013/0296123 A1 | 11/2013 | Doering et al. | |

* cited by examiner

*Primary Examiner* — David J Hlavka
(74) *Attorney, Agent, or Firm* — David Kelley; McCoy Russell LLP

(57) ABSTRACT

A method for operating a vehicle that includes a driveline disconnect clutch is described. In one example, the method includes adjusting a pressure of the driveline disconnect clutch as a function of an engine pull-up torque minus a driver demand torque when the pressure of the driveline disconnect clutch is between a torque stroke pressure and a hydraulic stroke pressure.

20 Claims, 6 Drawing Sheets

METHOD FOR OPERATING A VEHICLE HAVING A DISCONNECT CLUTCH

FIELD

The present description relates to methods and a system for operating a vehicle that includes a driveline disconnect clutch. The methods and systems may reduce engine starting time while keeping driveline rotational losses low.

BACKGROUND AND SUMMARY

A vehicle may include a driveline disconnect clutch to decouple an engine from an electric machine and a remainder of a driveline. The driveline disconnect clutch may be opened during low driver demand conditions so that the engine may be shut-off to conserve fuel. However, if the driver demand torque or power is increased above a threshold level, then the driveline disconnect clutch may be closed to start the engine and allow engine torque or power to be combined with electric machine torque or power to meet driver demand torque or power.

The driveline disconnect clutch may be closed via hydraulic fluid applying pressure to plates of the driveline disconnect clutch. However, the driveline disconnect clutch may not begin to close and transfer torque until a threshold amount of pressure that is applied to the driveline disconnect clutch plates. It may take nearly a second or longer for the driveline disconnect clutch to begin to transfer torque from the electric machine to start the engine if the driveline disconnect clutch is commanded closed from a full open position. The time in between the driveline disconnect clutch close command and closing of the driveline disconnect clutch may be referred to as a driveline disconnect clutch closing time delay. The driveline disconnect clutch closing time delay may increase engine starting time and it may aggravate the vehicle's driver due to a lower than expected vehicle response.

The inventors herein have recognized the above-mentioned issues and have developed a vehicle operating method, comprising: adjusting a driveline disconnect clutch pressure to a torque stroke pressure via a controller in response to an engine pull-up torque minus a driver demand torque being less than a threshold; and adjusting the driveline disconnect clutch pressure from the torque stroke pressure as a function of the driver demand torque via the controller in response to the engine pull-up torque minus the driver demand torque being less than the threshold and in response to the driver demand torque being less than the engine pull-up torque.

By adjusting a driveline disconnect clutch pressure as a function of driver demand torque, it may be possible to provide the technical result of reducing engine starting time via pre-positioning a driveline disconnect clutch for a subsequent driveline disconnect closing request. In particular, if driver demand torque is increasing but less than an engine pull-up torque, then driveline disconnect clutch pressure may be increased such that a driveline disconnect clutch is closer to a pressure at which the driveline disconnect clutch fully closes. Consequently, if driver demand torque exceeds an engine pull-up torque, the driveline disconnect clutch may be fully closed in a short period of time without having to wait for a large pressure change within the driveline disconnect clutch.

The present description may provide several advantages. Specifically, the approach may reduce an amount of time it takes to close a driveline disconnect clutch so that the driveline disconnect clutch has torque capacity sufficient to rotate an engine. The approach may also reduce driveline noise and vibration during engine starting. In addition, the approach may reduce engine starting time while maintaining driveline efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
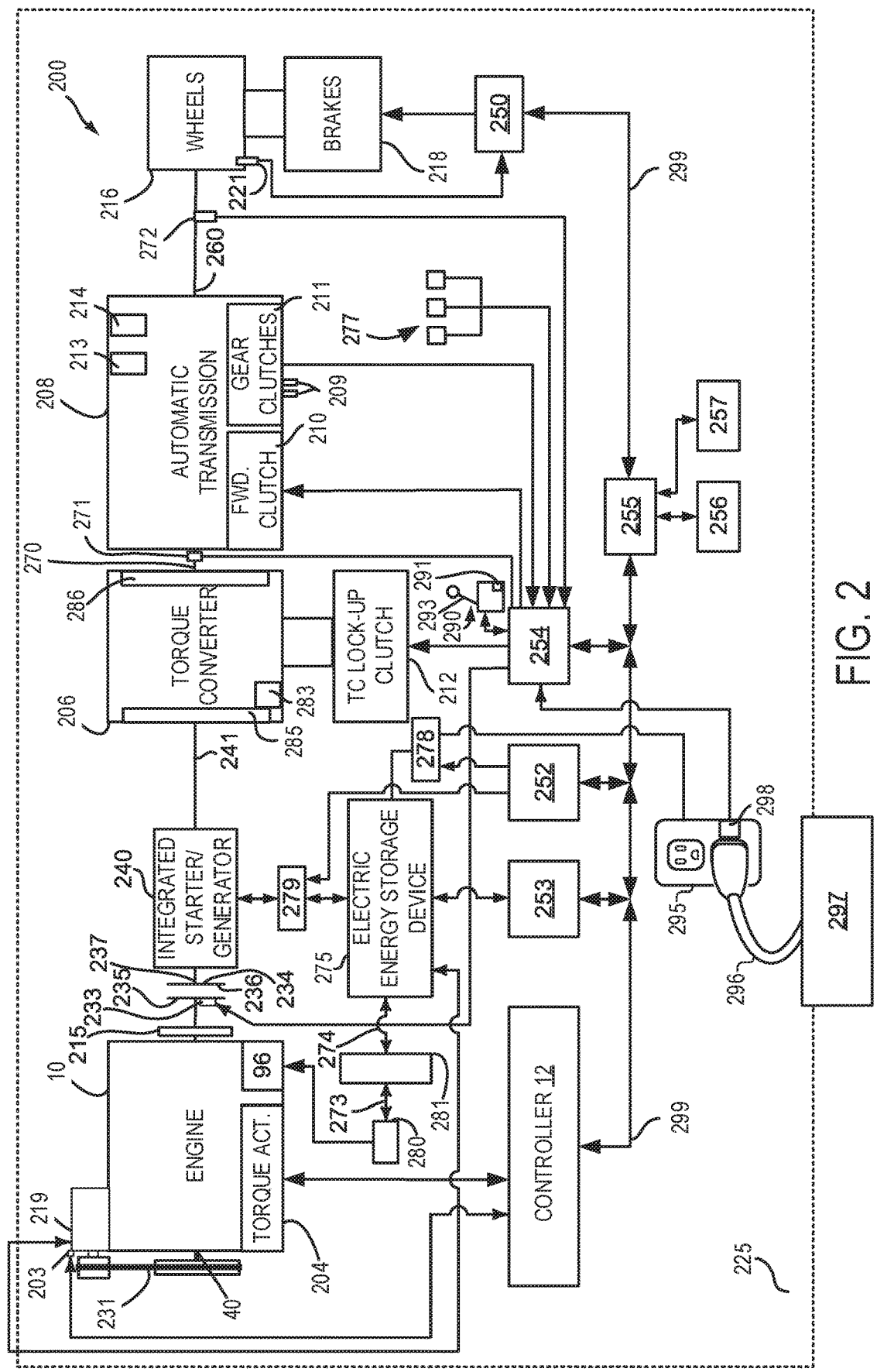
FIG. 2 shows a schematic diagram of an example vehicle driveline or powertrain including the internal combustion engine shown in FIG. 1.
Figure 3:
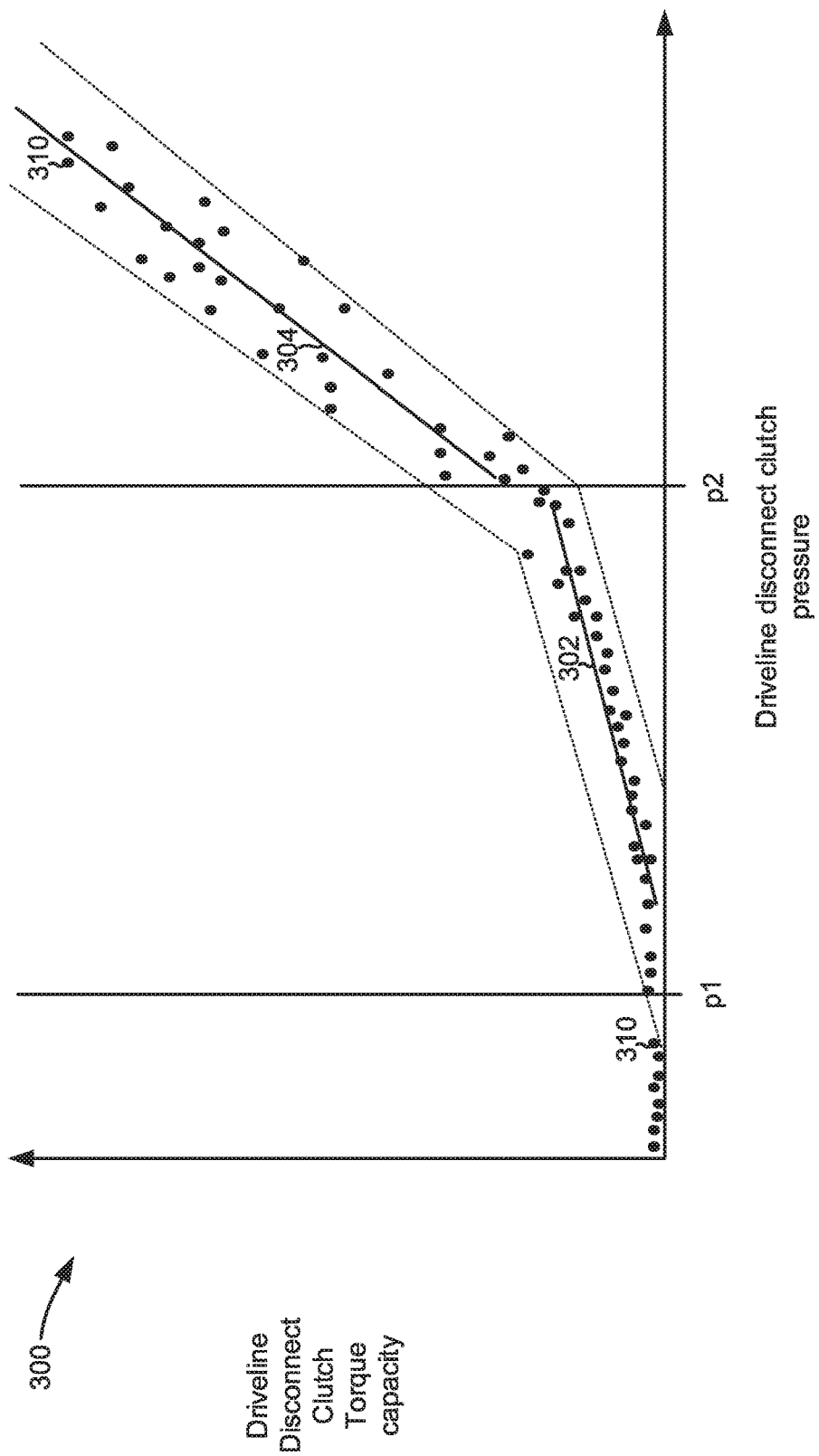
FIG. 3 shows plots of an example driveline disconnect clutch transfer function.
Figure 4:
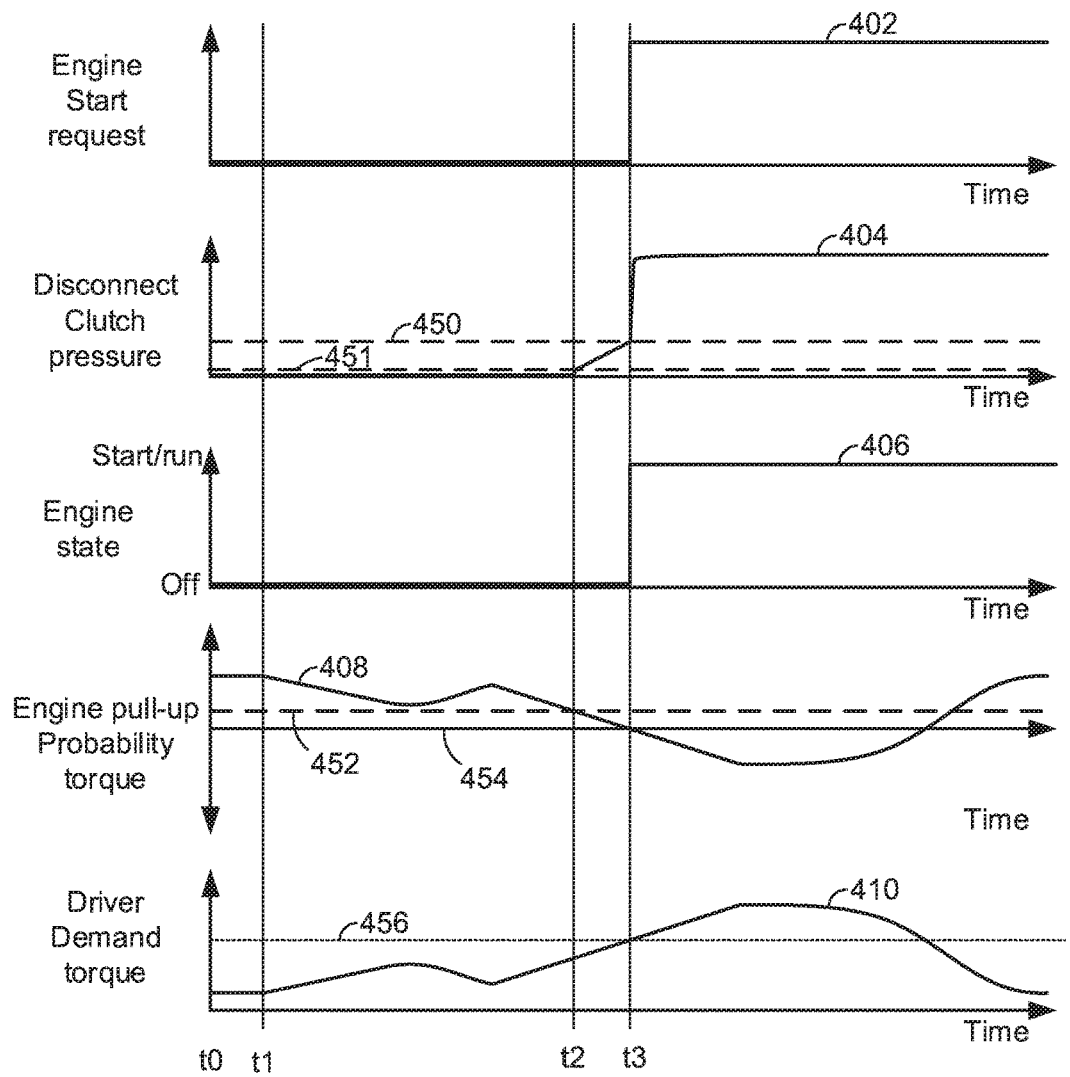
FIG. 4 shows an example driveline operating sequence according to the method of FIGS. 4 and 5.
Figure 5:
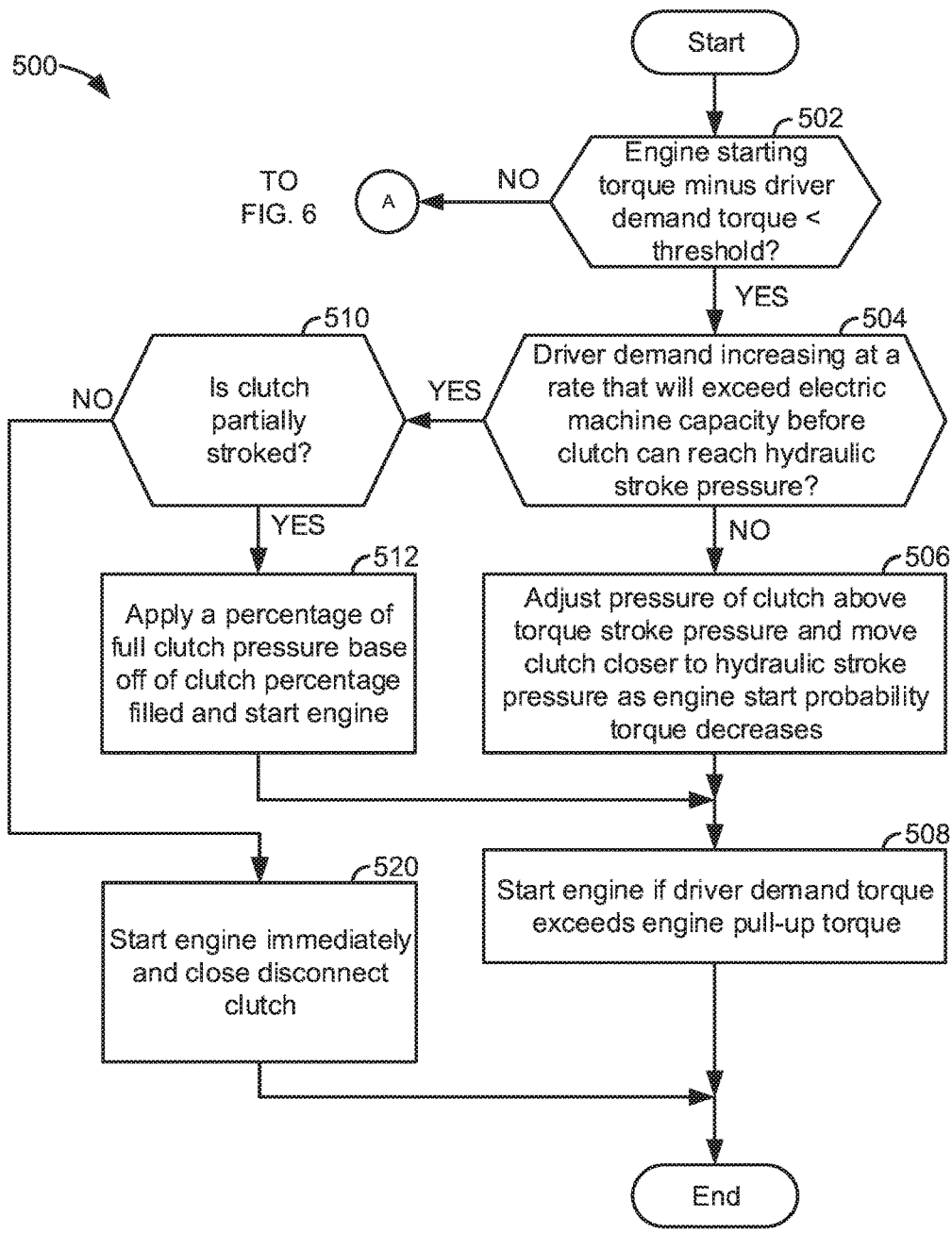
FIGS. 5 and 6 show a method for operating a driveline disconnect clutch.
Figure 6:
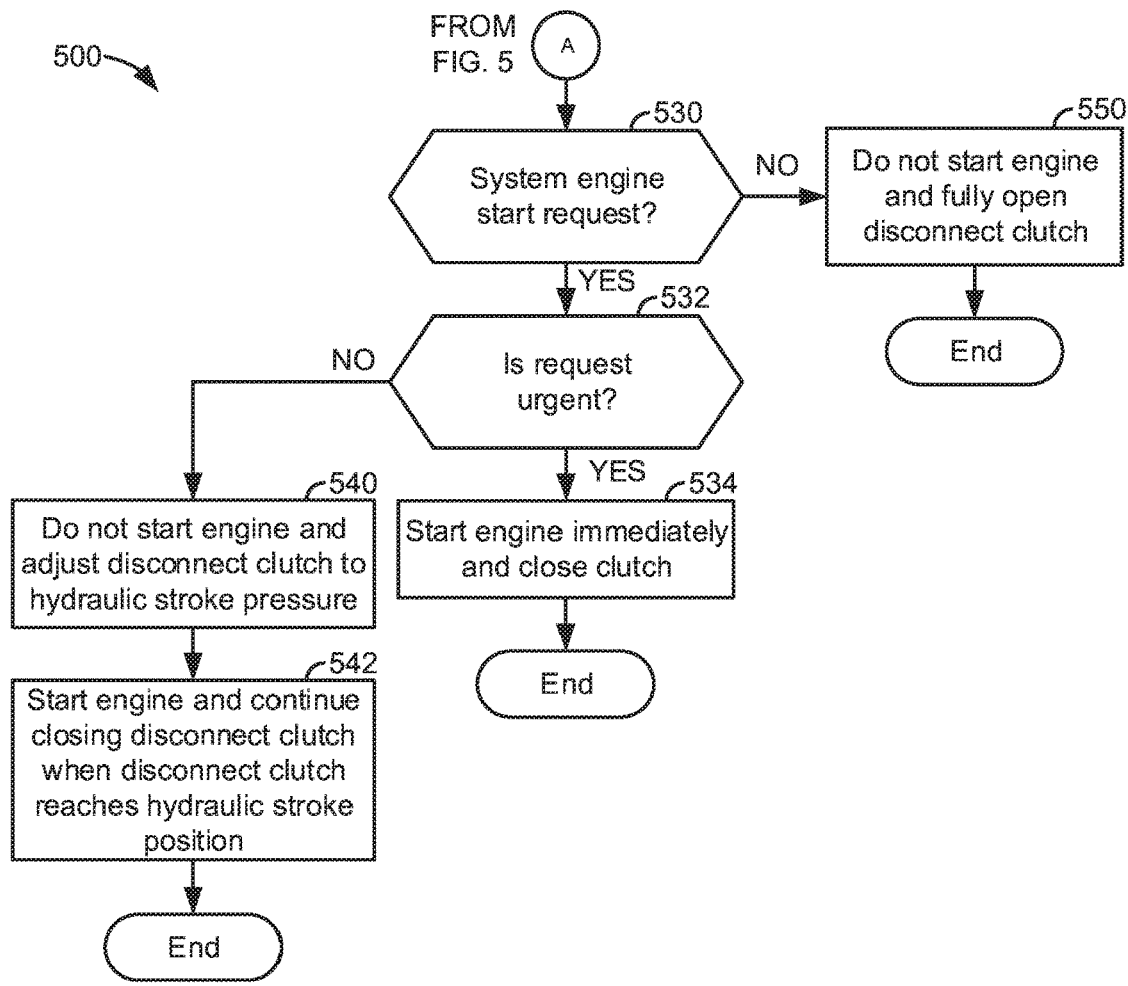

The present description is related to operating a driveline disconnect clutch of a vehicle. The driveline disconnect clutch may be hydraulically operated and control of hydraulic pressure within the driveline disconnect clutch may be adjusted via an electrically operated valve. The driveline disconnect clutch may be positioned in a driveline between an internal combustion engine and an electric machine. The internal combustion engine may be of the type shown in FIG. 1. The engine may be included in a driveline or powertrain as shown in FIG. 2. The driveline disconnect clutch may have a transfer function as shown in FIG. 3. The driveline disconnect clutch may be operated as shown in the sequence of FIG. 4 according to the method of FIGS. 5 and 6. A method for operating a driveline disconnect clutch is shown in FIGS. 5 and 6.

Figure 1:
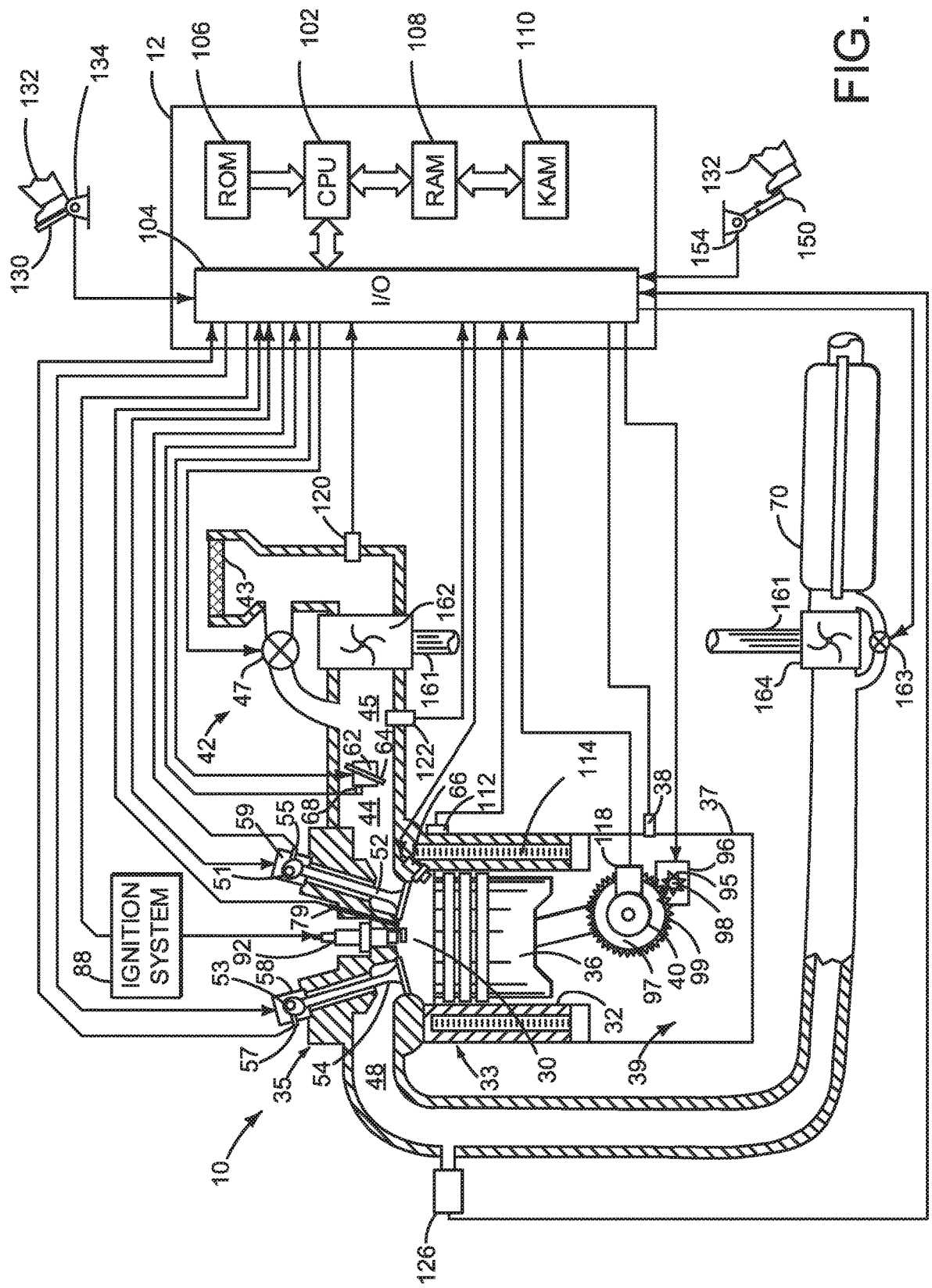
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. Pressure in crankcase 39 may be sensed via pressure sensor 38. Alternatively, pressure in crankcase 39 may be estimated.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a vehicle system, comprising: a driveline including an engine and an electric machine; a driveline disconnect clutch positioned in the driveline between the engine and the electric machine; and a controller including executable instructions stored in non-transitory memory to adjust a pressure applied to the driveline disconnect clutch as a function of a difference between an engine pull-up torque and a driver demand torque when the pressure applied to the driveline disconnect clutch is between a first pressure and a second pressure. The vehicle system includes where the first pressure is a torque stroke pressure, and where the second pressure is a hydraulic stroke pressure. The vehicle system includes where the torque stroke is a pressure at which an amount of torque transferred through the driveline disconnect clutch is greater than open driveline disconnect clutch drag torque.

In some examples, the vehicle system includes where the hydraulic stroke is a pressure above which a rate of rise of a torque capacity of the driveline disconnect clutch is greater than a threshold rate. The vehicle system includes where a rate of rise of the torque capacity of the driveline disconnect clutch is less than the threshold rate when the pressure applied to the driveline disconnect clutch pressure is between the first pressure and the second pressure. The vehicle system further comprises adjusting the pressure applied to the driveline disconnect clutch as a function of a clutch torque capacity when the pressure applied to the driveline disconnect clutch is greater than the second pressure. The vehicle system further comprises adjusting the pressure applied to the driveline disconnect clutch to a predetermined pressure in response to the difference between the engine pull-up torque and the driver demand torque being less than a threshold torque.

Referring now to FIG. 3, a plot 300 of an example driveline disconnect clutch transfer function is shown. The vertical axis of plot 300 represents torque transfer capacity of the driveline disconnect clutch (e.g., an amount of torque that the driveline disconnect clutch may transfer from a first side of the driveline disconnect clutch to a second side of the driveline disconnect clutch for a given driveline disconnect clutch pressure). The torque transfer capacity of the driveline disconnect clutch increases in the direction of the vertical axis arrow. The horizontal axis represents hydraulic pressure within the driveline disconnect clutch or driveline disconnect clutch pressure. The driveline disconnect clutch pressure increases from the left side of the plot to the right side of the plot.

Dots 310 and similar dots not labeled represent data points showing a relationship between driveline disconnect clutch pressure and driveline disconnect clutch torque capacity. Vertical lines at driveline disconnect clutch pressure p1 and at driveline disconnect clutch pressure p2 break plot 300 into three regions. The first region is from the vertical axis to p1. The second region is from p1 to p2. The third region is driveline disconnect clutch pressures above p2. The first region represents a region where driveline disconnect clutch torque capacity does not increase with an increase in pressure within the driveline disconnect clutch. The second region represents a region where torque capacity of the driveline disconnect clutch may not respond or may provide a delayed response for a given change in driveline disconnect clutch pressure. The third region represents a region where torque capacity of the driveline disconnect clutch exhibits a nearly immediate change in driveline disconnect clutch torque capacity for a given driveline disconnect clutch pressure.

The pressure p1 may be referred to as a torque stroke pressure. The torque stroke pressure is a pressure at which torque passing through the driveline disconnect clutch is greater than open driveline disconnect clutch drag torque. In other words, the driveline disconnect clutch may deliver at least a portion of torque that is input to the driveline disconnect clutch at pressure p1 and pressures greater than pressure p1. Separator plates and friction plates within the driveline disconnect clutch may never be perfectly aligned, thereby causing driveline disconnect clutch torque capacity to vary when a piston within the driveline disconnect clutch starts to unseat (lift off). As pressure within the driveline disconnect clutch increases past the torque stroke pressure it will eventually reach a hydraulic stroke pressure. The hydraulic stroke pressure is a pressure within the driveline disconnect clutch above which torque capacity of the driveline disconnect clutch changes nearly immediately for a given change in driveline disconnect clutch pressure. Hydraulic stroke pressure is the driveline disconnect clutch pressure at which the volume of oil needed to move the apply piston within the driveline disconnect clutch has reach zero. As pressure builds within the driveline disconnect clutch above the hydraulic stroke pressure, the torque capacity of the driveline disconnect clutch increases.

Nevertheless, due to the nature of a hydro-mechanical clutch, moving the driveline disconnect clutch pressure closer to the hydraulic stroke pressure increases drag on the electric motor when the engine is not started because of the engine's parasitic drag is being transferred through the driveline disconnect clutch. Increasing drag within the driveline disconnect clutch when the engine is off may negatively impact driveline efficiency and clutch hardware reliability because the bulk temperature of the clutch is increased. Further, electric machine temperature may increase, which may not be desirable, due to system layout.

Line 302 represents a line generated via linear regression (e.g., least squares regression) of data points 300 in the second region. Line 304 represents a line generated via linear regression of data points 300 in the third region. The slope of line 302 is less than the slope of line 304. The slope of the line is the rate of change in the line and the slopes of lines 302 and 304 represent rates of change in driveline disconnect clutch torque capacity with respect to driveline disconnect clutch pressure. Thus, a rate of rise of a torque capacity of the driveline disconnect clutch is greater than a threshold rate when the driveline disconnect clutch pressure is greater than the hydraulic stroke is a pressure. Further, the rate of rise of the torque capacity of the driveline disconnect clutch is less than the threshold rate when the pressure applied to the driveline disconnect clutch pressure is between the torque stroke pressure and the hydraulic stroke pressure (e.g., when the driveline disconnect clutch pressure is between p1 and p2).

Referring now to FIG. 4, a vehicle operating sequence according to the method of FIGS. 5 and 6 is shown. The vehicle operating sequence of FIG. 4 may be provided via the system of FIGS. 1 and 2 in cooperation with the method of FIGS. 5 and 6. The plots shown in FIG. 3 are time aligned and occur at the same time. The vertical lines represent times of interest during the sequence.

The first plot from the top of FIG. 4 is a plot of a state of an engine start request. The vertical axis represents the state of the engine start request. The engine start request is asserted when trace 402 is at a higher level near the vertical axis arrow. The engine start request is not asserted when trace 402 is at a lower level near the horizontal axis. The horizontal axis represents time and time increases from the left side of the figure to the right side of the figure. Trace 402 represents the state of the engine start request.

The second plot from the top of FIG. 4 is a plot of driveline disconnect clutch pressure versus time. The vertical axis represents the driveline disconnect clutch pressure and the driveline disconnect clutch pressure increases in the direction of the vertical axis arrow. Horizontal line 451 represents a level of a torque stroke pressure. Horizontal line 450 represents a level of a hydraulic stroke pressure. The horizontal axis represents time and time increases from the left side of the figure to the right side of the figure. Trace 404 represents the driveline disconnect clutch pressure.

The third plot from the top of FIG. 4 is a plot of an engine starting state versus time. The vertical axis represents the engine starting state. The engine is started and running when trace 406 is near the level of the vertical axis arrow. The engine is not running (e.g., not rotating and not combusting fuel) when trace 406 is near the level of the horizontal axis. Trace 406 represents the engine starting state. The horizontal axis represents time and time increases from the left side of the figure to the right side of the figure.

The fourth plot from the top of FIG. 4 is a plot of engine pull-up probability torque versus time. The vertical axis represents the engine pull-up probability torque and the engine pull-up probability torque increases in the direction of the vertical axis arrow. Trace 408 represents the engine pull-up probability torque. The engine pull-up probability torque may be determined via subtracting a driver demand torque from an engine pull-up torque (e.g., a torque amount that when reached or exceeded by the driver demand torque causes the engine to be automatically started). Horizontal line 452 is a first threshold torque and horizontal line 454 is a second threshold torque. The driveline disconnect clutch pressure is controlled as a function of engine pull-up torque minus driver demand torque between horizontal line 452 and horizontal line 454. The driveline disconnect clutch pressure is not controlled as a function of engine pull-up torque minus driver demand torque when engine pull-up probability torque is less than horizontal line 454. The horizontal axis represents time and time increases from the left side of the figure to the right side of the figure.

The fifth plot from the top of FIG. 4 is a plot of driver demand torque versus time. The vertical axis represents the driver demand torque and the driver demand torque increases in the direction of the vertical axis arrow. Horizontal line 456 represents and engine pull-up torque. Trace 410 represents the driver demand torque. The horizontal axis represents time and time increases from the left side of the figure to the right side of the figure.

At time t0, the engine is off (e.g., not combusting fuel and not rotating) and the engine start request is not asserted. The driveline disconnect clutch pressure is near zero and the engine start probability torque level is higher than level 452. The driver demand torque is at a lower level.

At time t1, the driver demand torque begins increasing in response to a human driver applying an accelerator pedal (not shown). The engine start request is not asserted and the engine is off. The driveline disconnect clutch pressure is near zero and the engine pull-up probability torque is decreasing as the driver demand torque increases.

Between time t1 and time t2, the driver demand torque increases, then decreases, and then increases again. However, the engine pull-up probability torque does not fall below threshold level 452 so the driveline disconnect clutch pressure remains near zero. The engine remains stopped and the engine start request is not asserted.

At time t2, the engine pull-up probability torque is reduced to a level that is less than threshold 452, so the driveline disconnect clutch pressure is increased to the torque stroke pressure of line 451. The engine start request is not asserted and the engine remains stopped. The driver demand torque remains below the engine pull-up torque 456.

Between time t2 and time t3, the driveline disconnect clutch pressure is increased as the engine pull-up probability torque decreases. The driver demand continues to increase and the engine start request is not asserted. The engine is stopped.

At time t3, the driver demand torque exceeds the engine pull-up torque so the engine start request is asserted. The driveline disconnect clutch pressure is increased to close the driveline disconnect clutch sufficiently to transfer a sufficient amount of torque to rotate the engine via the electric machine (e.g., 240) shortly after time t3. The engine is started via rotating the engine via the electric machine (e.g., 240) and the driveline disconnect clutch. Fuel and spark are also delivered to the engine to start the engine. The engine is started shortly after time t3 and the driver demand torque continues to increase.

In this way, pressure within a driveline disconnect clutch may be controlled as a function of an engine pull-up probability torque. The pressure within the driveline disconnect clutch may be increased as a function of the engine pull-up probability torque. By increasing the driveline disconnect clutch pressure as a function of engine pull-up probability torque, it may be possible to reduce pressure pulsations within the driveline disconnect clutch that may result in driveline torque disturbances.

Referring now to FIGS. 5 and 6, a method for operating a vehicle is shown. At least portions of method 500 may be implemented as executable controller instructions stored in non-transitory memory. Method 500 may operate in cooperation with the system of FIGS. 1 and 2. Additionally, portions of method 500 may be actions taken in the physical world to transform an operating state of an actuator or device. The method of FIGS. 5 and 6 may be incorporated into the system of FIGS. 1 and 2 as executable instructions stored in non-transitory memory. The vehicle's engine may be stopped and the driveline disconnect clutch may be fully open before method 500 is entered.

At 502, method 500 judges whether or not engine pull-up torque minus driver demand torque is less than a threshold torque. The driver demand torque may be determined via accelerator pedal position and vehicle speed. In particular, accelerator pedal position and vehicle speed may be applied to reference a table or function of empirically determined values of driver demand torque. The values in the table or function may be determined via operating a vehicle on a chassis dynamometer and adjusting driver demand torque as a function of accelerator pedal position and vehicle speed until a desired vehicle response is achieved. If method 500 judges that engine pull-up torque minus driver demand torque is less than a threshold torque, the answer is yes and method 500 proceeds to 504. Otherwise, the answer is no and method 500 may proceed to 530.

At 504, method 500 judges if driver demand torque is increasing at a rate that will exceed the electric machine's torque capacity before pressure in the driveline disconnect clutch can reach the hydraulic stroke pressure of the driveline disconnect clutch. For example, if the driver demand torque is presently 50 Newton-meters (Nm), the electric machine torque capacity is 150 Nm, and the driver demand torque is presently increasing at a rate of 100 Nm/second, then it may be determined that the driver demand torque will exceed the torque capacity of the electric machine (e.g., ISG 240) just after 1 second from the present time. At the same time, if the driveline disconnect clutch hydraulic stroke pressure is 200 kilopascals, the present driveline disconnect clutch pressure is 20 kilopascals, and the maximum rate of pressure increase in the driveline disconnect clutch is 100 kilopascals/second, then it may be determined that the driver demand torque will exceed the torque capacity of the electric machine before the pressure in the driveline disconnect clutch reaches the hydraulic stroke pressure because it will take the driver demand torque just over 1 second to exceed the torque capacity of the electric machine and it will take 1.8 seconds for the pressure in the driveline disconnect clutch to reach the hydraulic stroke pressure. If method 500 judges that driver demand torque is increasing at a rate that will exceed the electric machine's torque capacity before pressure in the driveline disconnect clutch can reach the hydraulic stroke pressure of the driveline disconnect clutch, then the answer is yes and method 500 proceeds to 510. Otherwise, the answer is no and method 500 proceeds to 506.

At 506, method 500 adjusts a pressure that is applied to the driveline disconnect clutch or pressure in the driveline disconnect clutch as a function of engine pull-up torque minus driver demand torque. As engine pull-up torque minus driver demand torque is reduced hydraulic pressure supplied to and in the driveline disconnect clutch is increased to move the pressure in the driveline disconnect clutch closer to the hydraulic stroke pressure. This allows the driveline disconnect clutch to approach a state where hydraulic pressure in the driveline disconnect clutch where even a small increase in hydraulic pressure in the driveline disconnect clutch results in an increase in driveline disconnect clutch torque capacity with very little, if any, delay. The torque capacity of the driveline disconnect clutch is also distributed to the vehicle system controller and other controllers. Method 500 proceeds to 508.

At 508, method 500 closes the driveline disconnect clutch and starts the engine via rotating the engine via the electric machine (e.g., 240) if driver demand torque exceeds the engine pull-up torque. The driveline disconnect clutch may be closed via applying a maximum rate of hydraulic pressure increase to the driveline disconnect clutch. Alternatively, the hydraulic pressure that is supplied to the driveline disconnect clutch may be increased at a predetermined rate that is less than the maximum rate of hydraulic pressure increase to the driveline disconnect clutch. In still another example, the driveline disconnect clutch hydraulic pressure may be raised at a rate that is a function of driver demand torque. The hydraulic pressure that is supplied to the driveline disconnect clutch and that is in the driveline disconnect clutch is greater than the hydraulic stroke pressure of the driveline disconnect clutch so that the driveline disconnect clutch may rotate the engine via the electric machine (e.g., 240). Method 500 proceeds to exit.

At 510, method 500 judges if the driveline disconnect clutch is partially stroked. Method 500 may judge that the driveline disconnect clutch is partially stroked if the driveline disconnect clutch pressure is above a torque stroke pressure and below a hydraulic stroke pressure. If method 500 judges that the driveline disconnect clutch is partially stroked, the answer is yes and method 500 proceeds to 512. Otherwise, the answer is no and method 500 proceeds to 520.

At 520, method 500 immediately starts the engine and closes the driveline disconnect clutch. The engine is started via rotating the engine via the electric machine (e.g., ISG 240). The driveline disconnect clutch may be closed via applying a maximum rate of hydraulic pressure increase to the driveline disconnect clutch. Alternatively, the hydraulic pressure that is supplied to the driveline disconnect clutch may be increased at a predetermined rate that is less than the maximum rate of hydraulic pressure increase to the driveline disconnect clutch. In still another example, the driveline disconnect clutch hydraulic pressure may be raised at a rate that is a function of driver demand torque. The hydraulic pressure that is supplied to the driveline disconnect clutch and that is in the driveline disconnect clutch is greater than the hydraulic stroke pressure of the driveline disconnect clutch so that the driveline disconnect clutch may rotate the engine via the electric machine (e.g., 240). The torque capacity of the driveline disconnect clutch is also distributed to the vehicle system controller and other controllers. Method 500 proceeds to exit.

At 512, method 500 applies a percentage of a maximum driveline disconnect clutch pressure that is a function of the percentage that the driveline disconnect clutch's volume that is occupied via hydraulic fluid. For example, if maximum driveline disconnect clutch pressure is 1400 kilopascals and percentage of maximum driveline disconnect clutch pressure is given by the equation: f(percent of clutch volume filled)=50%, then the hydraulic pressure that is delivered to and in the driveline disconnect clutch is 700 kilopascals, where f is a function that returns the percentage of maximum driveline disconnect clutch pressure. The torque capacity of the driveline disconnect clutch is also distributed to the vehicle system controller and other controllers. Method 500 proceeds to exit.

At 530, method 500 judges if a system generated engine start request is present. A system initiated start request may be generated via battery state of charge (SOC) being less than a threshold amount. Further, a system initiated engine start may be initiated in response to sensing a state of traffic conditions or other conditions that are not a direct function of driver input. If method 500 judges that a system generated engine start is requested, the answer is yes and method 500 proceeds to 532. Otherwise, the answer is no and method 500 proceeds to 550.

At 550, method 500 does not start the engine, the engine remains stopped, and the driveline disconnect clutch is fully opened via reducing driveline disconnect clutch pressure to a pressure that is less than the torque stroke pressure. Method 500 proceeds to exit.

At 532, method 500 judges if the engine start request is urgent. An engine start request may be judged to be urgent if a vehicle component is determined to be degraded. Alternatively, method 500 may judge that an engine start request is urgent in response to traffic conditions. For example, an engine start request may be urgent if an engine is stopped and an emergency vehicle is detected with flashing lights. If method 500 judges that the engine start request is urgent, the answer is yes and method 500 proceeds to 534. Otherwise, the answer is no and method 500 proceeds to 540.

At 534, method 500 immediately starts the engine and closes the driveline disconnect clutch. The engine is started via rotating the engine via the electric machine (e.g., ISG 240). The driveline disconnect clutch may be closed via applying a maximum rate of hydraulic pressure increase to the driveline disconnect clutch. Alternatively, the hydraulic pressure that is supplied to the driveline disconnect clutch may be increased at a predetermined rate that is less than the maximum rate of hydraulic pressure increase to the driveline disconnect clutch. In still another example, the driveline disconnect clutch hydraulic pressure may be raised at a rate that is a function of driver demand torque. The hydraulic pressure that is supplied to the driveline disconnect clutch and that is in the driveline disconnect clutch is greater than the hydraulic stroke pressure of the driveline disconnect clutch so that the driveline disconnect clutch may rotate the engine via the electric machine (e.g., 240). The torque capacity of the driveline disconnect clutch is also distributed to the vehicle system controller and other controllers. Method 500 proceeds to exit.

At 540, method 500 does not start the engine and the driveline disconnect clutch pressure is increased to the hydraulic stroke pressure. The engine is not started so that the possibility of driveline torque disturbances may be reduced when the engine is started. Increasing the driveline disconnect clutch pressure to the hydraulic stroke pressure before starting the engine may reduce pressure oscillations in the driveline disconnect clutch. Method 500 proceeds to 542.

At 542, method 500 starts the engine in response to the driveline disconnect clutch pressure being equal to or greater than the hydraulic stroke pressure. The engine is started via rotating the engine with torque from the electric machine (e.g., 240) that is transferred through the driveline disconnect clutch. In addition, the driveline disconnect clutch pressure is increased above the hydraulic stroke pressure so that driveline disconnect clutch torque capacity is increased, thereby transferring additional torque to the engine from the electric machine. Engine starting includes supplying spark and fuel to the engine while the engine is rotated via the electric machine. Method 500 proceeds to exit.

In this way, a driveline disconnect clutch may be controlled so that the possibility of driveline vibration and torque disturbances may be reduced. Further, engine starting times may be reduced without significantly increasing driveline losses.

Thus, the method of FIGS. 5 and 6 provides for a vehicle operating method, comprising: adjusting a driveline disconnect clutch pressure to a torque stroke pressure via a controller in response to an engine pull-up torque minus a driver demand torque being less than a threshold; and adjusting the driveline disconnect clutch pressure from the torque stroke pressure as a function of the driver demand torque via the controller in response to the engine pull-up torque minus the driver demand torque being less than the threshold and in response to the driver demand torque being less than the engine pull-up torque. The method includes where the engine pull-up torque is the driver demand torque at which an engine is requested to be started. The method includes where the torque stroke pressure is a pressure at which an amount of torque transferred through the driveline disconnect clutch is greater than open driveline disconnect clutch drag torque.

In some examples, the method further comprises adjusting the driveline disconnect clutch pressure from the torque stroke pressure as a function of the engine pull-up torque. The method further comprises fully closing the driveline disconnect clutch and starting an engine in response to the driver demand torque exceeding the engine pull-up torque. The method further comprises commanding fully closing the driveline disconnect clutch and commanding engine starting in response to the engine pull-up torque minus the driver demand torque being less than the threshold and the driver demand torque increasing at a rate that will exceed a torque capacity of an electric machine before an earliest time when the driveline disconnect clutch pressure may reach a hydraulic stroke pressure. The method includes where the driveline disconnect clutch is positioned in a driveline between an engine and an electric machine.

The method of FIGS. 5 and 6 also provides for a vehicle operating method, comprising: adjusting a driveline disconnect clutch pressure to a torque stroke pressure via a controller in response to an engine pull-up torque minus a driver demand torque being less than a threshold; adjusting the driveline disconnect clutch pressure from the torque stroke pressure as a function of driver demand torque via the controller in response to the engine pull-up torque minus the driver demand torque being less than the threshold and in response to driver demand torque being less than the engine pull-up torque; and adjusting the driveline disconnect clutch pressure from a first pressure to a second pressure and starting an engine via a controller in response to the engine pull-up torque minus a driver demand torque being greater than the threshold and in response to an urgent engine start request.

In some examples, the method includes where the urgent engine start request is based on an indication of degradation of an electric machine. The method includes where the urgent engine start request is based on a traffic condition. The method includes where the second pressure is a pressure that fully closes the driveline disconnect clutch. The method includes where starting the engine includes rotating the engine via an electric machine that is coupled to the driveline disconnect clutch. The method includes where the driveline disconnect clutch is positioned in a driveline between an engine and an electric machine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
    adjusting a driveline disconnect clutch pressure to a torque stroke pressure via a controller in response to an engine pull-up torque minus a driver demand torque being less than a threshold; and
    adjusting the driveline disconnect clutch pressure from the torque stroke pressure as a function of the driver demand torque via the controller in response to the engine pull-up torque minus the driver demand torque being less than the threshold and in response to the driver demand torque being less than the engine pull-up torque.

2. The method of claim 1, where the engine pull-up torque is the driver demand torque at which an engine is requested to be started.

3. The method of claim 1, where the torque stroke pressure is a pressure at which an amount of torque transferred through the driveline disconnect clutch is greater than open driveline disconnect clutch drag torque.

4. The method of claim 1, further comprising adjusting the driveline disconnect clutch pressure from the torque stroke pressure as a function of the engine pull-up torque.

5. The method as claimed in claim 1, further comprising fully closing the driveline disconnect clutch and starting an engine in response to the driver demand torque exceeding the engine pull-up torque.

6. The method of claim 1, further comprising commanding fully closing the driveline disconnect clutch and commanding engine starting in response to the engine pull-up torque minus the driver demand torque being less than the threshold and the driver demand torque increasing at a rate that will exceed a torque capacity of an electric machine before an earliest time when the driveline disconnect clutch pressure may reach a hydraulic stroke pressure.

7. The method of claim 1, where the driveline disconnect clutch is positioned in a driveline between an engine and an electric machine.

8. A vehicle system, comprising:
    a driveline including an engine and an electric machine;
    a driveline disconnect clutch positioned in the driveline between the engine and the electric machine; and
    a controller including executable instructions stored in non-transitory memory to adjust a pressure applied to the driveline disconnect clutch as a function of a difference between an engine pull-up torque and a driver demand torque when the pressure applied to the driveline disconnect clutch is between a first pressure and a second pressure.

9. The vehicle system of claim 8, where the first pressure is a torque stroke pressure, and where the second pressure is a hydraulic stroke pressure.

10. The vehicle system of claim 9, where the torque stroke is a pressure at which an amount of torque transferred through the driveline disconnect clutch is greater than open driveline disconnect clutch drag torque.

11. The vehicle system of claim 9, where the hydraulic stroke is a pressure above which a rate of rise of a torque capacity of the driveline disconnect clutch is greater than a threshold rate.

12. The vehicle system of claim 11, where the rate of rise of the torque capacity of the driveline disconnect clutch is less than the threshold rate when the pressure applied to the driveline disconnect clutch pressure is between the first pressure and the second pressure.

13. The vehicle system of claim 8, further comprising adjusting the pressure applied to the driveline disconnect clutch as a function of a clutch torque capacity when the pressure applied to the driveline disconnect clutch is greater than the second pressure.

14. The vehicle system of claim 8, further comprising adjusting the pressure applied to the driveline disconnect clutch to a predetermined pressure in response to the difference between the engine pull-up torque and the driver demand torque being less than a threshold torque.

15. A vehicle operating method, comprising:
- adjusting a driveline disconnect clutch pressure to a torque stroke pressure via a controller in response to an engine pull-up torque minus a driver demand torque being less than a threshold;
- adjusting the driveline disconnect clutch pressure from the torque stroke pressure as a function of driver demand torque via the controller in response to the engine pull-up torque minus the driver demand torque being less than the threshold and in response to driver demand torque being less than the engine pull-up torque; and
- adjusting the driveline disconnect clutch pressure from a first pressure to a second pressure and starting an engine via a controller in response to the engine pull-up torque minus a driver demand torque being greater than the threshold and in response to an urgent engine start request.

16. The method of claim 15, where the urgent engine start request is based on an indication of degradation of an electric machine.

17. The method of claim 15, where the urgent engine start request is based on a traffic condition.

18. The method of claim 15, where the second pressure is a pressure that fully closes the driveline disconnect clutch.

19. The method of claim 15, where starting the engine includes rotating the engine via an electric machine that is coupled to the driveline disconnect clutch.

20. The method of claim 15, where the driveline disconnect clutch is positioned in a driveline between an engine and an electric machine.

* * * * *